June 23, 1942.   T. V. BUCKWALTER   2,287,165
LOCOMOTIVE CROSSHEAD
Filed Aug. 17, 1940
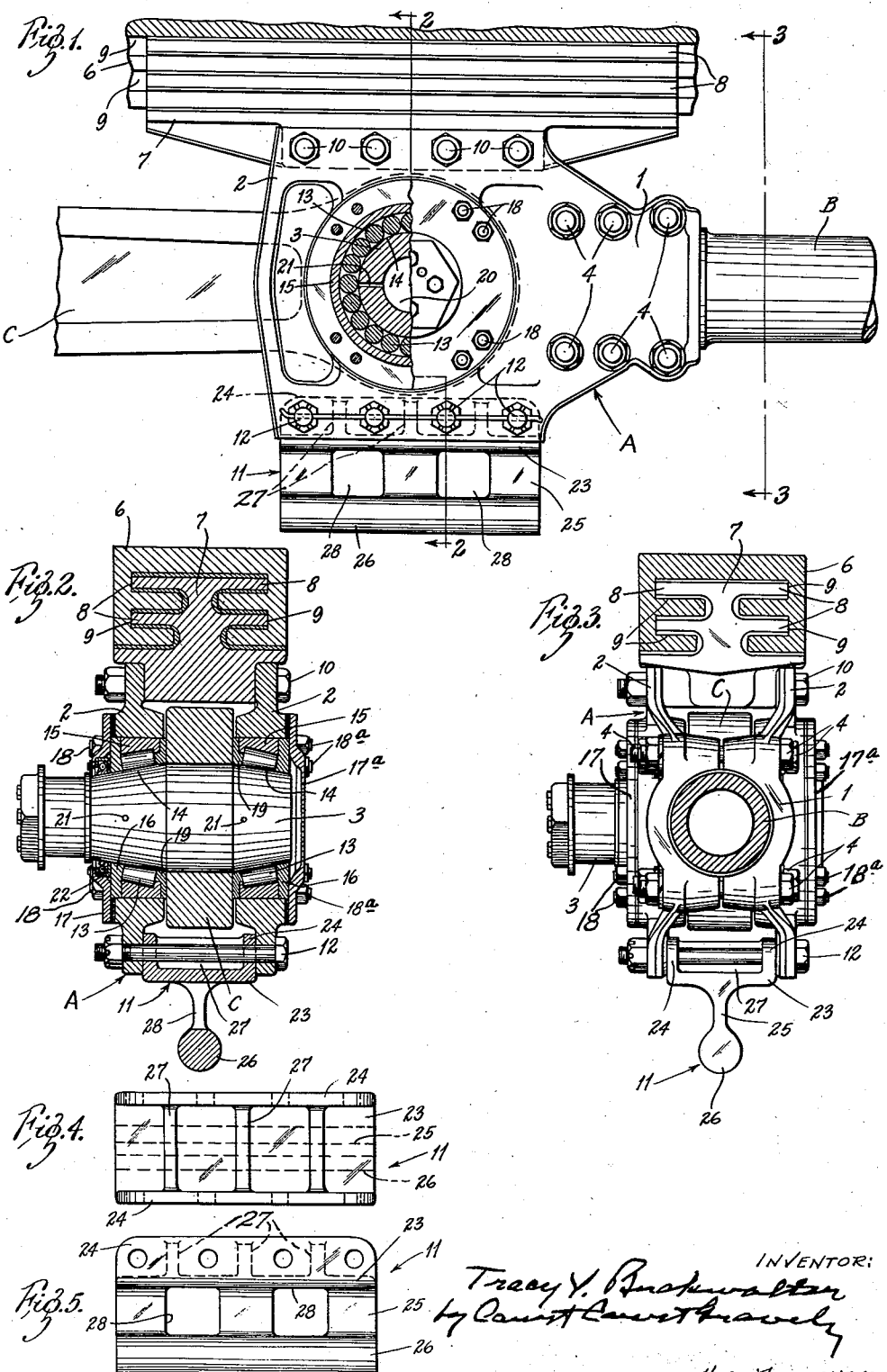
INVENTOR:
Tracy V. Buckwalter
HIS ATTORNEYS.

Patented June 23, 1942

2,287,165

UNITED STATES PATENT OFFICE 2,287,165

LOCOMOTIVE CROSSHEAD

Tracy V. Buckwalter, Massillon, Ohio, assignor to The Timken Roller Bearing Company, Canton, Ohio, a corporation of Ohio Application August 17, 1940, Serial No. 353,046

8 Claims. (Cl. 308—3)

This invention relates to locomotive crossheads of the so-called Laird type that are suspended from and reciprocate in guides located wholly above the piston rod, thereby resulting in unbalanced inertia forces which set up rapidly reversing destructive bending stresses in the piston rod and increase the wear between the guides and cross head. The invention has for its principal object to reduce the unbalanced inertia forces in the above type of crosshead and thus minimize the disadvantages hereinbefore referred to. Other objects are simplicity, cheapness of construction and compactness of design. The invention consists in the improved crosshead and in the construction, combinations and arrangements of parts hereinafter described and claimed.

In the accompanying drawing, which forms part of this specification and wherein like symbols refer to like parts wherever they occur, Fig. 1 is a side elevation of a Laird type locomotive crosshead embodying my invention, said crosshead being shown partly in section, Fig. 2 is a vertical section on the line 2—2 in Fig. 1, Fig. 3 is a vertical section on the line 3—3 in Fig. 1, Fig. 4 is a plan view of the weighted spacer of the crosshead; and Fig. 5 is a side elevation of said spacer.

In the accompanying drawing, my invention is disclosed embodied in a locomotive crosshead of the Laird type. Said crosshead comprises a yoke member A having a tubular shank portion 1 adapted to receive the back end of the piston rod B of the locomotive and horizontally spaced parallel branches 2 between which the forward end of the main rod C of the locomotive is pivotally secured by means of a horizontal wrist pin 3 that extends transversely of said branches. The yoke member is split or divided longitudinally in a vertical plane into duplicate half sections, each forming one of the branches 2 of said yoke member and one-half of the shank portion thereof. The piston rod B is clamped between the shank forming portions of the two half sections of the yoke member A by means of horizontal cross bolts 4; the crosshead is suspended from and reciprocates in an overhead multiple ledge guide 6 by means of a shoe 7 having outstanding side ribs 8 slidably engaging the ways 9 in said guide. The lower portion of said shoe is clamped between the branches 2 of the yoke member A above the wrist pin 3 by means of through bolts 10. A spacer 11 is also clamped between the branches of the yoke member below the wrist pin 3 by through bolts 12.

The branches 2 of the yoke member A and the portion of the main rod C disposed therebetween are provided with alined openings adapted to receive the ends of the wrist pin 3. The middle portion of the wrist pin 3 has a tight fit in the opening in the main rod; and the ends of said wrist pin are rotatably supported in antifriction bearings in the openings in the respective branches of the yoke member. These bearings are preferably in the form of taper roller bearings; each comprising conical bearing rollers 13 interposed between a conical raceway 14 formed on the wrist pin and a cup or outer bearing member 15 seated in the wrist pin receiving opening in one of the branches of the yoke member. Mounted in each yoke arm or branch 2 opposite the outer ends of the rollers 13 and cup 15 of the bearing therein is an annular closure plate 16. The annular plates 16 are held in place in the respective yoke arms by adjusting members 17 and 17a, respectively. The adjusting member 17 is in the form of an annular plate that is held in place by nuts 18; and the adjusting member 17a is in the form of a circular plate that covers the inner end of the wrist pin 3 and is held in place by nuts 18a. At the inner ends of the cups are annular wear or friction plates 19 that are mounted in the yoke arms in abutting relation to the cups and rollers of the bearings therein. The wrist pin 3 is made hollow so as to form a chamber or reservoir 20 therein for lubricant and has radial lubricant passageways 21 leading from said chamber to the outer ends of the conical raceway portions 14 of said pin. A suitable annular oil seal 22 is provided between the wrist pin 3 and the annular adjusting member 17.

As shown in the drawing, the spacer member 11 located between the branches 2 of the yoke member A below the wrist pin 3 supported therein is of substantially T-shaped section; that is, it comprises a cross or head piece 23 of substantially channel-shaped section, whose upstanding side flanges 24 abut flatwise against opposing inner faces of the respective branches of said yoke member, and a depending, centrally disposed longitudinal stem or flange portion 25 whose lower margin is thickened out into a bulbous longitudinal rib or rounded enlargement 26. As shown in the drawing, the cross piece or head 23 at the upper end of the spacer member 11 has a series of longitudinally spaced upstanding stiffening and strengthening ribs 27 that extend crosswise of said head from side flange to side flange thereof; and the depending stem 25 of said spacer has one or more openings 28 extending therethrough transversely thereof between the bulb-shaped lower edge 26 thereof and the head of said spacer.

The hereinbefore described crosshead construction has several important advantages. The lower spacer member 11 for the branches 2 of the yoke member A of the crosshead is ribbed to increase the strength and reduce the weight thereof and the bulb 26 at the lower edge of the depending stem 25 of said spacer operates as a weight to balance the unbalanced inertia forces in the crosshead due to its suspension from the guide 6 located entirely above the wrist pin 3. This weighted lower end of the spacer is located as far as practicable below the horizontal center line of the crosshead so as to balance to some extent the weight of the shoe 7 located above said line and thus reduce the bending stresses in the piston rod during the reciprocating motion of the crosshead, which stresses are extremely high at high speeds and are rapidly reversed during such movement. The balancing of the weight of the crosshead shoe also minimizes wear between the crosshead shoe and guide due to the tendency for the crosshead to rotate about the crank pin axis when the sliding movement of the crosshead is reversed.

What I claim is:

1. In a locomotive crosshead construction, a horizontally disposed overhead guide, a crosshead suspended from and slidable along said guide, a piston rigidly connected to said crosshead below said guide for moving said crosshead therealong, a main rod pivotally connected to said crosshead at the level of said piston, and means on the lower portion of said crosshead for balancing the unbalanced inertia forces in said construction due to the overhead suspension of said crosshead, said means comprising a member rigid with and extending below the bottom of said crosshead, the lower portion of said member being enlarged to provide increased weight at a maximum distance below said piston rod.

2. In a locomotive crosshead construction, a horizontally disposed overhead guide, a crosshead having a shoe at the top thereof suspended from and slidable along said guide, a piston rigidly connected to said crosshead below said shoe, a main rod pivotally connected to said crosshead below said shoe, and means for balancing the unbalanced inertia forces in said construction due to the overhead suspension of said crosshead, said means comprising a member rigid with said crosshead and having a depending flange terminating below said crosshead in a heavy bulbous rib.

3. In a locomotive crosshead construction, a horizontally disposed overhead guide, a crosshead having a shoe at the top thereof suspended from and slidable along said guide, a piston rod rigidly connected to said crosshead below said shoe, a main rod pivotally connected to said crosshead below said shoe, and means for balancing the unbalanced inertia forces in said construction due to the overhead suspension of said crosshead, said means comprising a member rigid with said crosshead and having a depending flange extending below said crosshead and terminating at its lower edge in a heavy bulbous rib, said flange being skeletonized to decrease the weight thereof above said rib.

4. In a locomotive crosshead construction, a horizontally disposed overhead guide, a crosshead suspended from and slidable on said guide, a piston and a main rod, said crosshead comprising a yoke member having a shank portion connected to said piston and spaced branches between which are received said main rod, a wrist pin mounted in said branches for supporting said main rod therebetween, and a spacer member secured between said branches below said main rod and having a portion extending a substantial distance below the lower edges of said branches for balancing the unbalanced inertia forces in said construction due to the overhead suspension of said crosshead.

5. A locomotive crosshead construction, a horizontally disposed overhead guide, a crosshead suspended from and slidable on said guide, a piston and a main rod, said crosshead comprising a yoke member having a shank portion connected to said piston and spaced branches between which are received said main rod, a wrist pin mounted in said branches for supporting said main rod therebetween, and a spacer member secured between said branches below said main rod and having a depending longitudinal portion extending a substantial distance below the lower edges of said branches and terminating at its lower edge in a bulb-shaped enlargement.

6. In a locomotive crosshead construction, a horizontally disposed overhead guide, a crosshead suspended from and slidable along said guide, a piston rod and a main rod, said crosshead comprising a yoke member having a shank portion rigidly connected to said piston rod below the level of said guide and spaced branches between which are received said main rod, a wrist pin mounted in said branches for supporting said main rod therebetween, and a member having a channel-shaped upper portion extending longitudinally of and secured between said branches below said wrist pin and having a depending central longitudinal flange with a thickened bulb-shaped lower margin spaced below the lower edges of said branches.

7. In a locomotive crosshead construction, a horizontally disposed overhead guide, a crosshead suspended from and slidable along said guide, a piston rod and a main rod, said crosshead comprising a yoke member having a shank portion connected to said piston rod and spaced branches through which are received said main rod, a wrist pin mounted in said branches for supporting said main rod therebetween, and a member having a channel-shaped upper portion extending longitudinally of and secured between said branches below said main rod and having a depending central longitudinal flange with a thickened bulb-shaped lower margin spaced below the lower edges of said branches, said member having openings extending through the flange thereof between the channel-shaped upper portion thereof and the bulb-shaped lower portion thereof and stiffening flanges extending crosswise of said channel-shaped upper portion.

8. In a locomotive crosshead construction, a horizontally disposed overhead guide, a crosshead suspended from and slidable along said guide, a piston rod rigidly connected to said crosshead below said guide, a main rod operatively connected to said crosshead below said guide, and means on said crosshead for balancing the unbalanced inertia forces in said construction due to the overhead suspension of said crosshead, said means comprising a T-shaped member having a head portion secured to said crosshead below the level of said piston rod and a depending stem terminating below said crosshead in a bulb-shaped lower edge.

TRACY V. BUCKWALTER.